(12) United States Patent
Yamamoto et al.

(10) Patent No.: US 8,590,123 B2
(45) Date of Patent: Nov. 26, 2013

(54) METHOD FOR PRODUCING ELECTRONIC COMPONENT

(75) Inventors: Atsushi Yamamoto, Kyoto-fu (JP); Akihiro Nakamura, Kyoto-fu (JP)

(73) Assignee: Murata Manufacturing Co., Ltd., Kyoto-Fu (JP)

(*) Notice: Subject to any disclaimer, the term of this patent is extended or adjusted under 35 U.S.C. 154(b) by 0 days.

(21) Appl. No.: 13/564,607

(22) Filed: Aug. 1, 2012

(65) Prior Publication Data

US 2012/0297610 A1    Nov. 29, 2012

Related U.S. Application Data

(63) Continuation of application No. PCT/JP2011/051889, filed on Jan. 31, 2011.

(30) Foreign Application Priority Data

Feb. 1, 2010    (JP) .................................. 2010-020131

(51) Int. Cl.
    *H01G 7/00*    (2006.01)
(52) U.S. Cl.
    USPC ....... 29/25.42; 29/25.41; 361/306.3; 336/200
(58) Field of Classification Search
    USPC .......... 29/592.1, 25.35–25.42, 831, 840, 851, 29/602.1; 336/200, 232, 221–223; 156/89.12; 361/311, 309, 303, 306.3
    See application file for complete search history.

(56) References Cited

U.S. PATENT DOCUMENTS

| | | | |
|---|---|---|---|
| 5,349,743 A * | 9/1994 | Grader et al. ................. | 29/602.1 |
| 6,189,200 B1 * | 2/2001 | Takeuchi et al. ............. | 29/602.1 |
| 6,304,164 B1 * | 10/2001 | Ohno et al. .................... | 336/200 |
| 6,489,877 B1 | 12/2002 | Yamamoto et al. | |
| 6,504,466 B1 * | 1/2003 | Katsurada ..................... | 336/200 |
| 8,058,964 B2 * | 11/2011 | Sato .............................. | 336/232 |
| 8,125,763 B2 * | 2/2012 | Kobayashi et al. ........... | 361/309 |
| 2009/0251268 A1 * | 10/2009 | Sato .............................. | 336/200 |
| 2012/0297610 A1 * | 11/2012 | Yamamoto et al. ............ | 29/607 |

FOREIGN PATENT DOCUMENTS

| | | |
|---|---|---|
| JP | 03-014209 A | 1/1991 |
| JP | 03-078220 A | 4/1991 |
| JP | 04-016551 A | 1/1992 |
| JP | 04-061203 A | 2/1992 |

(Continued)

OTHER PUBLICATIONS

International Search Report; PCT/JP2011/051889; Mar. 15, 2011.

*Primary Examiner* — Minh Trinh
(74) *Attorney, Agent, or Firm* — Studebaker & Brackett PC (57) ABSTRACT

The disclosure provides a method for producing an electronic component in which the oxidation of Cu constituting an internal conductor part of the component is inhibited or prevented in a firing step, and even when a magnetic body part containing NiO, ZnO, $Fe_2O_3$, etc. is reduced in the firing step, the magnetic body part is subsequently oxidized to ensure the original characteristics. In producing the electronic component, an unfired laminated body including parts to serve as the magnetic body part and the internal conductor part after firing is subjected to firing in an atmosphere with an oxygen concentration equal to or lower than the equilibrium oxygen partial pressure of $Cu$—$Cu_2O$, and the fired laminated body is then subjected to an oxygenic-atmosphere heat treatment in an atmosphere with an oxygen concentration of 0.01% or more in a step of decreasing the temperature.

8 Claims, 4 Drawing Sheets

(56) References Cited

FOREIGN PATENT DOCUMENTS

| JP | 05-326242 A | 12/1993 |
| JP | 07-097525 B | 10/1995 |
| JP | 2001-143918 A | 5/2001 |
| JP | 2010-278075 A | 12/2010 |

* cited by examiner

FIG.6

METHOD FOR PRODUCING ELECTRONIC COMPONENT

CROSS REFERENCE TO RELATED APPLICATIONS

The present application claims priority to International Application No. PCT/JP2011/051889 filed on Jan. 31, 2011, and to Japanese Patent Application No. 2010-020131 filed on Feb. 1, 2010, the entire contents of each of these applications being incorporated herein by reference in their entirety.

TECHNICAL FIELD

The technical field relates to a method for producing an electronic component, and more particularly, relates to a method for producing an electronic component including a magnetic body part and an internal conductor part provided in the magnetic body part.

BACKGROUND

As an electronic component (ferrite element) including a magnetic body part (ferrite) and an internal conductor part provided in the magnetic body part, a ferrite element has been disclosed which is formed by integrally firing an internal conductor (copper conductor) provided in a magnetic body (ferrite matrix) with a PbO constituent added at a ratio of 0.3 parts by weight or more and 5.0 parts by weight or less with respect to 100 parts by weight of nickel-zinc based ferrite. See, claim 1 of Publication of Examined Japanese Patent Application No. 7-97525 (Patent Document 1).

In addition, a ferrite element has been disclosed which is formed by integrally firing an internal conductor (copper conductor) provided in a magnetic body (ferrite matrix) with a PbO constituent added at a ratio of 0.3 parts by weight or more and 5.0 parts by weight or less, a $B_2O_3$ constituent at a ratio of 0.03 parts by weight or more and 1.5 parts by weight or less, and an $SiO_2$ constituent at a ratio of 0.03 parts by weight or more and 1.5 parts by weight or less. See, claim 2 in Patent Document 1.

Further, in each case of the ferrite elements, in order to reduce the firing temperature of the ferrite matrix, firing is carried out at a temperature of 950 to 1030° C., which is lower than the melting point of Cu constituting the internal conductor in a nitrogen atmosphere with the addition of low-melting-point constituents such as PbO, $B_2O_3$, and $SiO_2$.

SUMMARY

The present disclosure provides a method for producing an electronic component, which can inhibit or prevent the oxidation of Cu constituting an internal conductor part in a firing step, and which, even when a magnetic body part containing NiO, ZnO, $Fe_2O_3$, etc. is reduced (for example, the reduction of $Fe_2O_3$ to $Fe_3O_4$) in the firing step, can subsequently oxidize the magnetic body part to ensure the original characteristics, thereby efficiently producing a highly reliable electronic component which has favorable characteristics.

In an embodiment of the disclosure, a method for producing an electronic component includes a magnetic body part containing at least NiO, ZnO, and $Fe_2O_3$; and an internal conductor part containing Cu as its main constituent, where the internal conductor part is provided in the magnetic body part and partially extracted to a surface of the magnetic body part. The method has a feature including a firing step of firing an unfired laminated body in an atmosphere with an oxygen concentration equal to or lower than an equilibrium oxygen partial pressure of Cu—$Cu_2O$, the unfired laminated body having an unfired internal conductor material to serve as the internal conductor part after the firing, the unfired internal conductor material provided in an unfired magnetic material to serve as the magnetic body part after the firing; and an oxygenic-atmosphere heat treatment step of subjecting a fired laminated body obtained by the firing in the firing step to a heat treatment in an atmosphere with an oxygen concentration of 0.01% or more in a subsequent temperature decrease process.

In a more specific embodiment, the method may have a feature in that the oxygenic-atmosphere heat treatment step is carried out by stopping a temperature drop in the temperature decrease process at a predetermined temperature, and maintaining the temperature at the stopped temperature for a predetermined period of time.

In another more specific embodiment, in the method for producing an electronic component, the heat treatment temperature in the oxygenic-atmosphere heat treatment step preferably may be a temperature of 900° C. or lower.

In yet another more specific embodiment, the method for producing an electronic component may further include an oxide film removal step of polishing a surface of a fired laminated body obtained through the oxygenic-atmosphere heat treatment step to remove an oxide film on a surface of the internal conductor part extracted to the surface of the magnetic body part.

DETAILED DESCRIPTION

The inventors realized that in the case of the respective ferrite elements in Patent Document 1 mentioned above, the low-melting-point constituents (i.e., glass constituents) such as PbO, $B_2O_3$, and $SiO_2$ are present in the ferrite in each case, and there is thus a problem that abnormal grain growth is caused in the firing step and leads to failure to achieve favorable electrical characteristics.

In addition, while the ferrite matrix (i.e., ferrite magnetic substance) and the internal conductor (Cu) are subjected to co-firing in a nitrogen atmosphere in Patent Document 1, it is known from Ellingham diagrams (not shown), which show equilibrium oxygen partial pressures of oxides, that there is no region for coexistence of Cu with $Fe_2O_3$ at high temperatures of 800° C. or higher from the relationship between the equilibrium oxygen partial pressure of Cu—$Cu_2O$ and the equilibrium oxygen partial pressure of $Fe_2O_3$—$Fe_3O_4$. More specifically, at temperatures of 800° C. or higher, when firing is carried out with an oxygen partial pressure set to such an oxidizing atmosphere that maintains the state of $Fe_2O_3$, Cu is also oxidized to produce $Cu_2O$. On the other hand, when firing is carried out with an oxygen partial pressure set to such a reducing atmosphere that maintains the state of Cu metal, $Fe_2O_3$ is reduced to produce $Fe_3O_4$.

More specifically, in the case of co-firing the ferrite matrix (i.e., ferrite magnetic substance) and the internal conductor (i.e., Cu), firing under such an oxygen partial pressure that does not reduce the ferrite oxidizes the Cu constituting the internal conductor to keep the Cu from adequately serving as the internal conductor, whereas the case of firing under such a condition that maintains the metal state without oxidizing the Cu reduces the ferrite to possibly keep the ferrite from adequately serving as the magnetic body.

Accordingly, although the ferrite and the Cu are subjected to co-firing in a nitrogen atmosphere in Patent Document 1, there is no region for coexistence of Cu with $Fe_2O_3$, thus, firing in such a reducing atmosphere that oxidizes Cu has a problem of the specific resistance p decreased because of the reduction of the ferrite, and for this reason, there is a possibility of failing to achieve high characteristics or reliability required for the electronic component.

With reference to exemplary embodiments below, features of the present disclosure that can address the above problems will be described in more detail.

Figure 2:
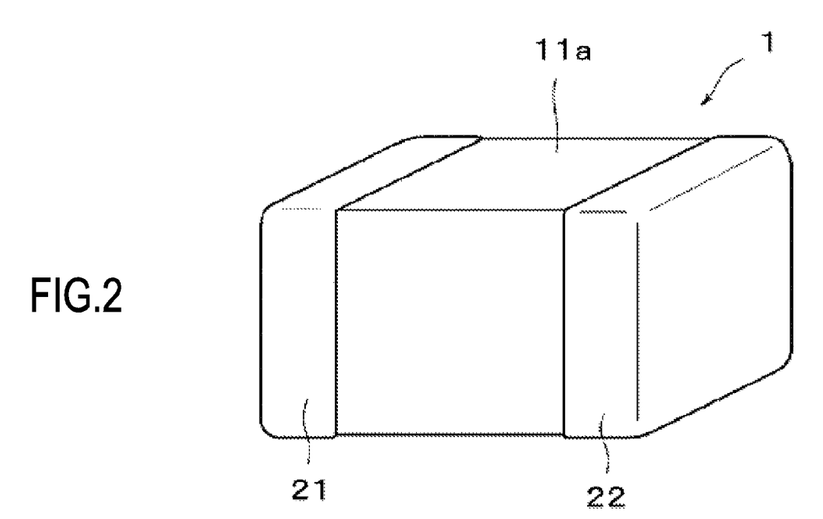
FIG. 2 is a perspective view illustrating an electronic component (laminate-type coil component) produced by a method for producing an electronic component according to an exemplary embodiment.
Figure 3:
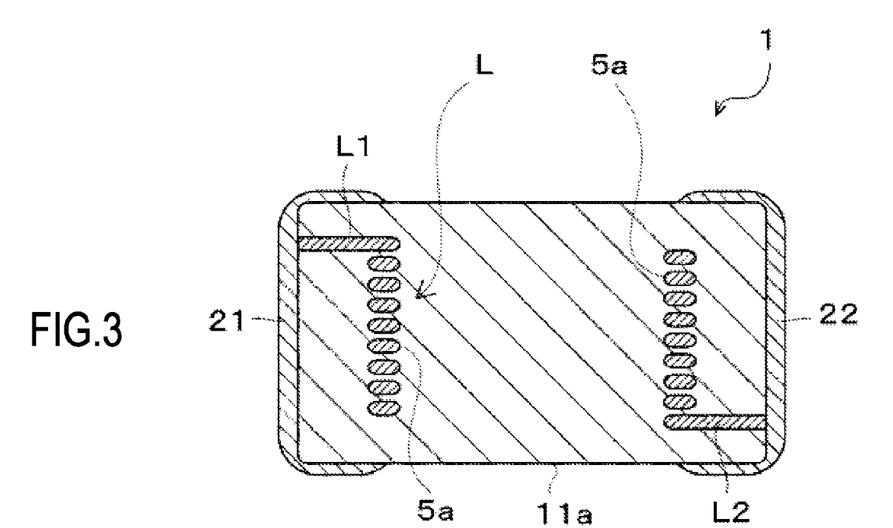
FIG. 3 is a front cross-sectional view of an electronic component (laminate-type coil component) produced by a method for producing an electronic component according to an exemplary embodiment.

In a first exemplary embodiment, a laminated coil component was prepared as shown in FIGS. 2 and 3 by a method according to an example of the present disclosure.

This laminate-type coil component 1 has, as shown in FIGS. 2 and 3, a structure including a pair of external electrodes 21 and 22 provided on both ends of a laminated body (i.e., magnetic body part) 11a including therein a helical coil L composed of internal conductor parts 5a by interlayer connection. The pair of external electrodes (21, 22) are to be electrically conducted with both ends (L1, L2) of the coil L. It is to be noted that the electronic component to which the present invention can be applied is not to be limited to the laminate-type coil component as shown in FIGS. 2 and 3, and embodiments according to the present disclosure can be applied widely in the case of producing various electronic components including an internal conductor part and a magnetic conductor part.

An explanation will be given below on an exemplary method for producing the electronic component.

(1) Preparation of Magnetic Ceramic Green Sheet

First, prepared were an $Fe_2O_3$ powder, a ZnO powder, an NiO powder, and a CuO powder.

Then, the $Fe_2O_3$ powder, the ZnO powder, the NiO powder, and the CuO powder were weighed to have the following ratios of:

| | |
|---|---|
| $Fe_2O_3$ | 49.0 mol % |
| ZnO | 30.0 mol % |
| NiO | 20.0 mol % |
| CuO | 1.0 mol %, | thereby providing a compounded magnetic raw material.

Then, this compounded magnetic raw material was subjected to wet mixing for 20 hours in a ball mill with zirconia media (zirconia balls) as grinding and mixing media, thereby providing a slurry.

Then, this slurry was dried with a drying machine, and subjected to calcination at 750° C. for 2 hours to obtain a calcined product. This calcined product was subjected to wet grinding for 20 hours in a ball mill, and after the completion of the grinding, mixed with the addition of a predetermined amount of binder, thereby providing a ceramic slurry.

The thus obtained ceramic slurry was formed into a sheet by a doctor blade method to obtain ceramic green sheets (i.e., magnetic ceramic green sheet) of, for example, 25 µm in thickness.

Next, via holes were formed in predetermined positions of the magnetic ceramic green sheets (i.e., unfired magnetic material), and a Cu paste (i.e., unfired internal conductor material) composed of a Cu powder, varnish, and a solvent was then applied by screen printing onto the surfaces of the magnetic ceramic green sheets to form predetermined conductor patterns (i.e., unfired internal conductor material) for coil and via hole conductors for interlayer connection.

It is to be noted that the magnetic ceramic green sheets prepared in the way described above were used directly as exterior magnetic ceramic green sheets for forming exterior parts, without forming any conductor patterns for coil or via hole conductors for interlayer connection.

(2) Preparation of Laminated Coil Component

Figure 1:
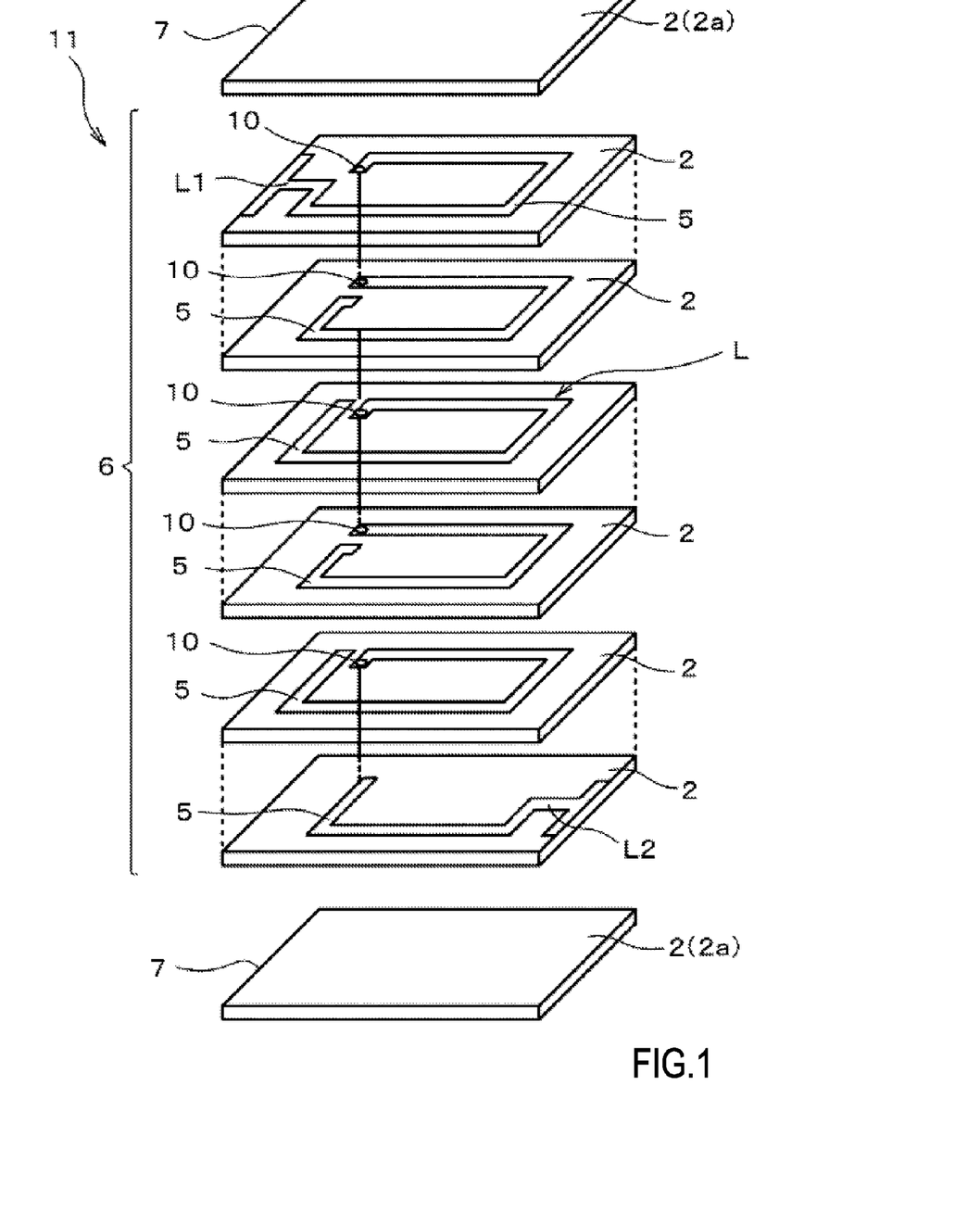
FIG. 1 is an exploded perspective view illustrating a method for forming a laminated body in a step of a method for producing an electronic component according to an exemplary embodiment.

As shown in FIG. 1, stacked in a predetermined order were magnetic ceramic green sheets (i.e., unfired magnetic material) 2 with conductors (i.e., unfired internal conductor material) 5 for coil and magnetic ceramic green sheets (exterior unfired magnetic material) 2 (2a) for outer layers without any conductors for coil.

Then, through pressure bonding at a temperature of 60° C. and a pressure of 100 MPa, a pressure-bonded block (not shown) was formed with a plurality of unfired laminated bodies 11. Each unfired laminated body 11 included: a built-in coil laminated part 6 incorporating a helical coil L provided with a plurality of the conductors 5 connected through via hole conductors 10; and an exterior part 7 provided on the outer sides of the built-in coil laminated part 6 in the stacking direction. Then, the pressure-bonded block was cut in a predetermined size (length L=1.6 mm, width W=0.8 mm in this example) to divide the pressure-bonded block into individual unfired laminated bodies 11. FIG. 1 is an exploded perspective view of one unfired laminated body 11 obtained by the cutting.

It is to be noted that the turn number of the coil L was adjusted to 9.5 turns in this example.

(3) Preparation of Disc Sample for Evaluation of Specific Resistance

In addition, multiple magnetic ceramic green sheets without conductor patterns for coil were stacked, and subjected to pressure bonding at a temperature of 60° C. and a pressure of 100 MPa in the same way as in the case of (2) described above, thereby preparing a pressure-bonded block without any conductor patterns for coil. This pressure-bonded block was subjected to punching into a disk to prepare disk samples of 1 mm in thickness and 10 mm in diameter.

(4) Degreasing for Unfired Laminated Body and Disk Sample

The unfired laminated bodies prepared in the way described above and the unfired disk samples were subjected to a heat treatment at a predetermined temperature in an atmosphere with a predetermined oxygen concentration to carry out sufficient degreasing (binder removal). It is to be noted that an atmosphere that does not oxidize Cu as an internal conductor was selected for the oxygen concentration for the degreasing.

(5) Firing After Degreasing for Laminated Body and Disk Sample

The laminated bodies and disk samples after being subjected to the degreasing were put into a firing furnace in which an oxygen partial pressure is controlled, while flowing a mixed gas of $N_2$—$H_2$—$H_2O$, heated up to a top temperature (1000° C.) at a rate of temperature increase of 3° C./minute, and kept at the top temperature for 2 to 4 hours to make the laminated bodies and disk samples sintered.

The oxygen partial pressure was set for the firing in such a way that the mixture ratio of the mixed gas of $N_2$—$H_2$—$H_2O$ was adjusted to thereby control the oxygen partial pressure derived from oxygen produced by the decomposition of $H_2O$, and thus the oxygen partial pressure was pressure equal to or lower than the equilibrium oxygen partial pressure ($6.6 \times 10^{-2}$ Pa at 1000° C.) of Cu—$Cu_2O$. Specifically, the firing was carried out with the oxygen partial pressure in the range of $6.6 \times 10^{-2}$ Pa to $6.6 \times 10^{-3}$ Pa.

(6) Heat Treatment Under Oxygenic Atmosphere in Process of Decreasing Temperature of Laminated Body and Disk Sample Next, at the stage of the completion of keeping at the top temperature, the temperature was decreased at a rate of temperature decrease of 3° C./minute.

Then, as shown in Table 1, at the stage of decreasing the temperature down to 900 to 600° C., the gas put into the firing furnace was changed to an $N_2$—$O_2$ mixed gas or air, the temperature was decreased down to room temperature at a rate of temperature decrease of 3° C./minute, and the fired laminated bodies and disk samples were taken out (conditions 2 to 8 in Table 1).

In addition, for the samples under conditions 9 to 13 in Table 1, at the stage of decreasing the temperature down to 500 to 600° C., the gas put in the firing furnace was changed to an $N_2$—$O_2$ mixed gas or air, the temperature was decreased down to room temperature after keeping for 1 to 3 hours under the atmosphere containing oxygen (oxygenic atmosphere), and the fired laminated bodies and disk samples were taken out.

In addition, a sample was also created which was not subjected to the heat treatment as described above (condition 1 in Table 1).

TABLE 1

| | Condition for Oxygenic-Atmosphere Heat Treatment | | | Result | |
|---|---|---|---|---|---|
| Condition Number | Oxygen Concentration in Heat Treatment Step | Start Temperature of Heat Treatment (° C.) | Keeping Temperature/ Keeping Time | Specific Resistance Log ρ (Ω·cm) | Stretched Plating |
| *1 (Comparative Example) | No Oxidation Treatment | — | No Keeping | 3.18 | X |
| 2 | 20% (air) | 900 | No Keeping | 7.25 | ○ |
| 3 | 0.01% ($N_2$—$O_2$) | 900 | No Keeping | 7.21 | ○ |
| 4 | 20% (air) | 800 | No Keeping | 7.18 | ○ |
| 5 | 0.1% ($N_2$—$O_2$) | 800 | No Keeping | 7.16 | ○ |
| 6 | 0.01% ($N_2$—$O_2$) | 800 | No Keeping | 7.02 | ○ |
| 7 | 20% (air) | 700 | No Keeping | 6.62 | ○ |
| 8 | 20% (air) | 600 | No Keeping | 6.08 | ○ |
| 9 | 20% (air) | 600 | 600° C./1 hour | 6.20 | ○ |
| 10 | 20% (air) | 600 | 600° C./3 hours | 6.35 | ○ |
| 11 | 0.1% ($N_2$—$O_2$) | 600 | 600° C./3 hours | 6.12 | ○ |
| 12 | 0.01% ($N_2$—$O_2$) | 600 | 600° C./3 hours | 6.09 | ○ |
| 13 | 20% (air) | 500 | 500° C./3 hours | 6.03 | ○ |

*Condition 1 for comparative example, and Conditions 2 to 13 for examples of Present Invention (7) Barrel Polishing for Fired Laminated Body Next, 500 samples for each of the fired laminated bodies obtained through the step (6) (oxygenic-atmosphere heat treatment step) described above were put into a pot (volume: 1000 ml) for a barrel polishing machine along with zirconia media (zirconia balls) of approximately φ1 mm with the addition of 300 ml of pure water, and the pot was rotated at a predetermined rotation speed for a predetermined period of time to apply barrel polishing to the fired laminated bodies.

It is to be noted that this barrel polishing is carried out for polishing the surfaces of the laminated bodies (fired laminated bodies) obtained through the oxygenic-atmosphere heat treatment step (6) to remove oxide films formed on the end surfaces of the coils (internal conductor parts) L extracted to the surfaces of the laminated bodies.

(8) Formation of External Electrode onto Laminated Body after Barrel Polishing

Next, a conductive paste for the formation of external electrodes, which was composed of an Ag powder, glass frit, varnish, and a solvent, was applied onto both ends of the laminated bodies (fired laminated bodies) subjected to the barrel polishing, and subjected to drying, and then to firing under a temperature condition of 750° C. in an atmosphere with a predetermined oxygen partial pressure, thereby forming fired electrodes to serve as external electrode main bodies. Then, the fired electrodes were subjected to electrolytic plating by a well-known method to sequentially form a nickel plating film and a tin plating film on the surfaces of the fired electrodes, thereby forming the pair of external electrodes 21 and 22 for providing electrical conduction to the both ends L1, L2 of the coil L on both ends of the fired laminated body (i.e., magnetic body part) 11a as shown in FIGS. 2 and 3.

In this way, as shown in FIGS. 2 and 3, prepared was the laminated coil component 1 including the pair of external electrodes 21 and 22 (see FIG. 2) for providing electrical conduction to the both ends of the coil L formed by interlayer connection of the conductors for coil (i.e., internal conductor parts) 5a provided in the fired laminated body 11a.

(9) Measurement Method and Evaluation for Characteristics (a) Impedance Curve

Figure 4:
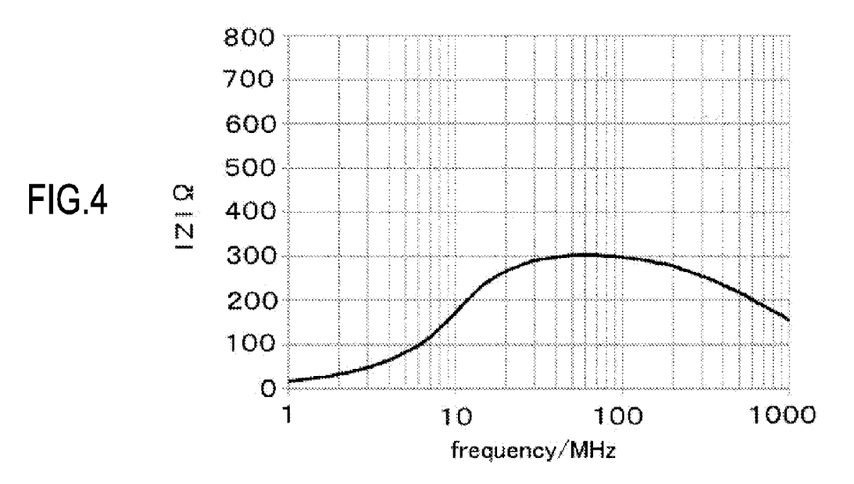
FIG. 4 is a diagram showing an impedance curve for a laminated coil component produced by a method not in accordance with the present disclosure.
Figure 5:
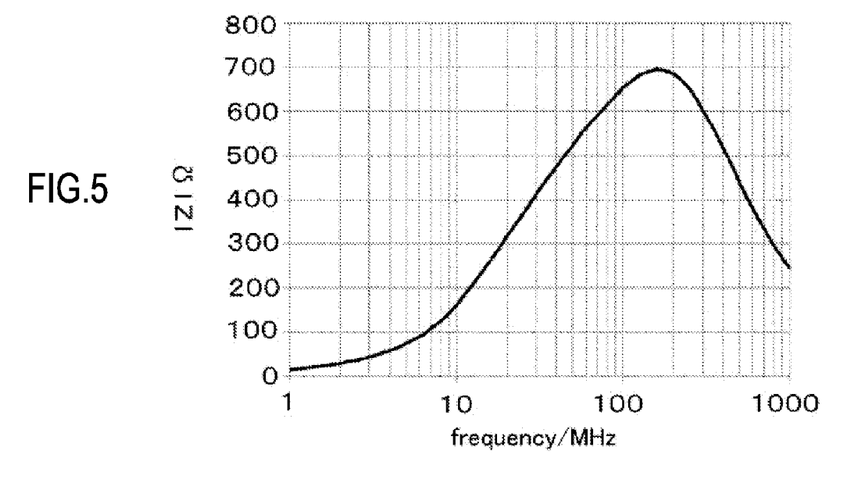
FIG. 5 is a diagram showing an impedance curve for a laminated coil component produced by a method according to an exemplary embodiment.
Figure 6:
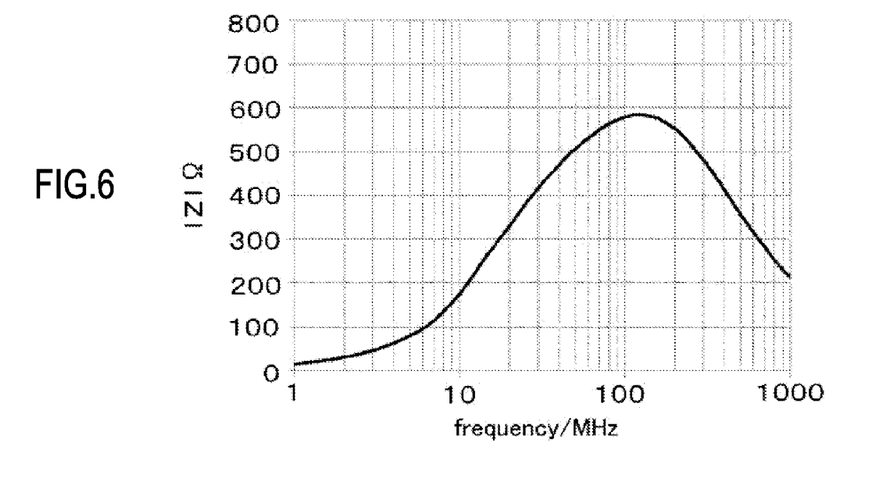
FIG. 6 is a diagram showing an impedance curve for another laminated coil component produced by a method according to an exemplary embodiment.

For the laminated coil components prepared in the way described above, impedance curves were measured with the use of an impedance analyzer (Model Number HP4291A) of Agilent Technologies. FIGS. 4, 5, and 6 respectively show impedance curves measured for the samples under conditions 1, 7, and 9 in Table 1.

As shown in FIG. 4, in the case of the sample under condition 1 in Table 1 (i.e., the sample as a comparative example, which fails to meet the requirements of the present invention), which was prepared without undergoing the step of carrying out the heat treatment in the oxygen-containing atmosphere (i.e., oxygenic-atmosphere heat treatment) in the process of decreasing the temperature after the completion of keeping at the top temperature, the impedance value was low, with the maximum value on the order of 300Ω around 70 MHz. This is due to characteristics decreased by the reduction of $Fe_2O_3$ constituting the magnetic body part to $Fe_3O_4$ in the firing step.

In contrast, in the case of the sample under condition 7 in Table 1, which was produced through the step of carrying out the heat treatment in the oxygen-containing atmosphere (i.e., oxygenic-atmosphere heat treatment) in the process of decreasing the temperature after the completion of keeping at the top temperature, it was confirmed that the obtained impedance value was high with the maximum value on the order of 700Ω at 100 to 200 MHz, as shown in FIG. 5.

Likewise, in the case of the sample under condition 9 in Table 1, which was produced through the step of carrying out the heat treatment in the oxygenic atmosphere in the process of decreasing the temperature after the completion of keeping at the top temperature, it was confirmed that the obtained impedance value was high with the maximum value on the order of 590Ω at 100 to 200 MHz, as shown in FIG. 6.

(b) Occurrence of Stretched Plating

In addition, the sample with the plating film stretched from one external electrode side toward the other external electrode side on the surface of the laminated body was determined as × on the ground of the occurrence of stretched plating. The determination results of thus checking whether or not stretched plating was caused are shown together in Table 1.

As shown in Table 1, the occurrence of stretched plating was recognized in the case of the sample under condition 1, which was produced without undergoing the oxygenic-atmosphere heat treatment step.

On the other hand, the occurrence of stretched plating was not recognized in the case of the samples under conditions 2 to 13 in Table 1, which were produced through the oxygenic-atmosphere heat treatment step.

(c) Specific Resistance

In addition, in order to measure the specific resistance of the magnetic body part, an electrode made of Ag was formed on both principal surfaces of the disk samples prepared in the way described above, for use as samples for specific resistance measurement.

Then, a direct-current electric field of 50 V was applied between the electrodes on the both principal surfaces of the disk sample to measure the insulation resistance (IR), and then calculate the specific resistance from the sample dimensions. The calculated values of the specific resistance are shown together in Table 1.

As shown in Table 1, it was confirmed that the specific resistance (log $\Sigma(\Omega \cdot cm)$) was a low value of 3.18 in the case of the sample under condition 1 in Table 1, which was prepared without undergoing the oxygenic-atmosphere heat treatment step.

On other hand, it was that the specific resistance (log $\rho(\Omega \cdot cm)$) was a high value of 6.03 to 7.25 in the case of the samples under conditions 2 to 13 in Table 1, which were prepared through the oxygenic-atmosphere heat treatment step.

It is to be noted that, as described above, the occurrence of stretched plating was recognized in the case of the sample under condition 1, which was produced without undergoing the oxygenic-atmosphere heat treatment step, because the plating was more likely to be stretched due to the fact that the magnetic body part was reduced in the firing step to decrease the specific resistance.

In addition, the occurrence of stretched plating was not recognized in the case of the other conditions (i.e., conditions 2 to 13), because the plating was less likely to be stretched due to the fact that the magnetic body part reduced in the firing step was oxidized in the oxygenic-atmosphere heat treatment step to increase the specific resistance.

From the foregoing results, it was confirmed that a highly reliable electronic component which has favorable characteristics is achieved by oxidizing the magnetic body part while inhibiting or preventing the internal conductor part from being oxidized, through the implementation of the oxygenic-atmosphere heat treatment step of carrying out the heat treatment in the oxygen-containing atmosphere in the process of decreasing the temperature after the completion of keeping at the top temperature.

It is to be noted that the present invention is not limited to the example described above, various applications and modifications can be made within the scope of the invention, regarding the specific conditions of the oxygenic atmosphere and the start temperature in the oxygenic-atmosphere heat treatment step carried out in the process of decreasing the temperature after the completion of keeping at the top temperature, and the keeping temperature and keeping time in the case of keeping at a constant temperature.

Further, while the method of barrel polishing is used in the example described above as a method for polishing the surface of the laminated body (fired laminated body) obtained through the oxygenic-atmosphere heat treatment step to remove oxide films on the end surfaces of the coil extracted to the surface of the laminated body, the specific method and conditions for the barrel polishing are not particularly limited. In addition, it is also possible to use known methods such as sandblasting, besides the barrel polishing.

A method for producing an electronic component according to the present disclosure includes: the firing step of firing the unfired laminated body in an atmosphere with an oxygen concentration equal to or lower than the equilibrium oxygen partial pressure of Cu—$Cu_2O$, the unfired laminated body having the unfired internal conductor material to serve as the internal conductor part after the firing, the unfired internal conductor material provided in the unfired magnetic material to serve as the magnetic body part after the firing; and the oxygenic-atmosphere heat treatment step of subjecting the fired laminated body obtained by the firing in the firing step to a heat treatment in an atmosphere with an oxygen concentration of 0.01% or more in a subsequent temperature decrease process. Thus, the method allows firing to be carried out while preventing the Cu constituting the internal conductor part from being oxidized in the firing step, and allows the magnetic body part to be oxidized (such as the oxidation of $Fe_2O_3$ to $Fe_2O_4$) in the oxygenic-atmosphere heat treatment step to have desired characteristics, even when the magnetic body part is reduced (such as the reduction of $Fe_2O_4$ to $Fe_2O_3$) in the firing step to cause characteristic degradation such as a decrease in specific resistance.

As a result, the method can allow for efficiently producing a highly reliable electronic component which has favorable characteristics.

It is to be noted that the oxygen concentration condition in the range from the equilibrium oxygen concentration of Cu—$Cu_2O$ to $1/100$ ($10^{-2}$ times) the equilibrium oxygen concentration of Cu—$Cu_2O$ is preferably applied as "the atmosphere with the oxygen concentration equal to or lower than the equilibrium oxygen partial pressure of Cu—$Cu_2O$" in the firing step (main firing step). This is due to the fact that there is a tendency to cause the oxidation of the Cu when the oxygen concentration in the atmosphere in the firing step (i.e., the main firing step) is greater than the equilibrium oxygen concentration of Cu—$Cu_2O$, or a tendency to recover the specific resistance insufficiently by carrying out the heat treatment described above when the oxygen concentration falls below $1/100$ the equilibrium oxygen concentration.

In addition, when the oxygenic-atmosphere heat treatment step can be carried out by stopping a temperature drop in the temperature decrease process at a predetermined temperature, and keeping the temperature for a predetermined period of time, it is possible to ensure that the reduced magnetic body part is oxidized to make the magnetic body part have the original characteristics (for example, the specific resistance value decreased by the reduction is increased to a desired value).

In an exemplary method for producing an electronic component according to the present disclosure, the heat treatment temperature in the oxygenic-atmosphere heat treatment step can be a temperature of 900° C. or lower, thereby making it possible to oxidize the magnetic body part while inhibiting the Cu constituting the internal conductor part from being oxidized, and to further exert the effects described herein.

In exemplary embodiments, the heat treatment temperature in the oxygenic-atmosphere heat treatment step is preferably determined in consideration of the oxygen concentration in the atmosphere, the heat treatment time, etc., because the effect of the oxygenic-atmosphere heat treatment is affected by the oxygen concentration in the heat treatment atmosphere, the period of time for applying the heat treatment, etc.

In addition, the method can include a step of polishing the surface of the fired laminated body obtained through the oxygenic-atmosphere heat treatment step to remove an oxide film on the surface of the internal conductor part extracted to the surface of the magnetic body part, thereby making it possible to ensure electrical conduction between the internal conductor part and external electrodes, and to ensure the production of a more highly reliable electronic component, which is preferable.

What is claimed is:

1. A method for producing an electronic component comprising: a magnetic body part containing at least NiO, ZnO, and $Fe_2O_3$; and an internal conductor part containing Cu as its main constituent, the internal conductor part provided in the magnetic body part and partially extracted to a surface of the magnetic body part, the method comprising:

a firing step of firing an unfired laminated body in an atmosphere with an oxygen concentration equal to or lower than an equilibrium oxygen partial pressure of Cu—$Cu_2O$, the unfired laminated body having an unfired internal conductor material to serve as the internal conductor part after the firing, the unfired internal conductor material being provided in an unfired magnetic material to serve as the magnetic body part after the firing; and an oxygenic-atmosphere heat treatment step of subjecting a fired laminated body obtained by the firing in the firing step to a heat treatment in an atmosphere with an oxygen concentration of 0.01% or more in a subsequent temperature decrease process.

2. The method for producing an electronic component according to claim 1, wherein the oxygenic-atmosphere heat treatment step is carried out by stopping a temperature drop in the temperature decrease process at a predetermined temperature, and maintaining the temperature at the stopped temperature for a predetermined period of time.

3. The method for producing an electronic component according to claim 2, wherein a heat treatment temperature in the oxygenic-atmosphere heat treatment step is a temperature of 900° C. or lower.

4. The method for producing an electronic component according to claim 3, further comprising an oxide film removal step of polishing a surface of a fired laminated body obtained through the oxygenic-atmosphere heat treatment step to remove an oxide film formed on a surface of the internal conductor part, which was extracted to the surface of the magnetic body part as a result of the oxygenic-atmosphere heat treatment.

5. The method for producing an electronic component according to claim 2, further comprising an oxide film removal step of polishing a surface of a fired laminated body obtained through the oxygenic-atmosphere heat treatment step to remove an oxide film formed on a surface of the internal conductor part, which was extracted to the surface of the magnetic body part as a result of the oxygenic-atmosphere heat treatment.

6. The method for producing an electronic component according to claim 1, wherein a heat treatment temperature in the oxygenic-atmosphere heat treatment step is a temperature of 900° C. or lower.

7. The method for producing an electronic component according to claim 6, further comprising an oxide film removal step of polishing a surface of a fired laminated body obtained through the oxygenic-atmosphere heat treatment step to remove an oxide film formed on a surface of the internal conductor part, which was extracted to the surface of the magnetic body part as a result of the oxygenic-atmosphere heat treatment.

8. The method for producing an electronic component according to claim 1, further comprising an oxide film removal step of polishing a surface of a fired laminated body obtained through the oxygenic-atmosphere heat treatment step to remove an oxide film formed on a surface of the internal conductor part, which was extracted to the surface of the magnetic body part as a result of the oxygenic-atmosphere heat treatment.

* * * * *